R. W. WHITNEY,

Assignor to WILSON SEWING-MACHINE CO.

Lock for Drawers.

No. 8,079. Reissued Feb. 12, 1878.

*Witnesses:*

Forde R. Smith

Edwin H. King

*Inventor:*

Ruel W. Whitney by Munday & Evarts

Attys.

UNITED STATES PATENT OFFICE.

RUEL W. WHITNEY, OF NEW YORK, N. Y., ASSIGNOR TO WILSON SEWING-MACHINE COMPANY, OF CHICAGO, ILL.

IMPROVEMENT IN LOCKS FOR DRAWERS.

Specification forming part of Letters Patent No. 158,876, dated January 19, 1875; Reissue No. 8,079, dated February 12, 1878; application filed January 14, 1878.

*To all whom it may concern:*

Be it known that I, RUEL W. WHITNEY, formerly of Cleveland, in the county of Cuyahoga and State of Ohio, but now of the city of New York, in the county of New York and State of New York, have invented an Improved Sewing-Machine-Cabinet Drawer-Lock, of which the following is a specification:

This invention relates to a lock for cabinet-drawers for sewing-machine tables; and consists of a flat bolt pivoted at its center to a plate, both of which are fixed in a slot cut in the cross-bar of the cabinet between two drawers, the key for turning the bolt entering a hole in the center of the bolt within the pivot; and the bolt is intended to lock two drawers, one above the other.

The invention further consists in the combination, with the drawers and the cross-bar, of a double turn-bolt pivoted in the cross-bar, as will be fully understood from the following description.

To enable others to fully understand my invention, I will proceed to describe the same in detail by the aid of the accompanying drawing, in which—

Figure 1:
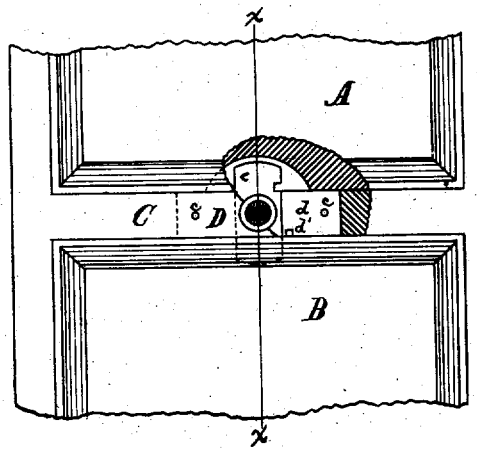
Figure 2:
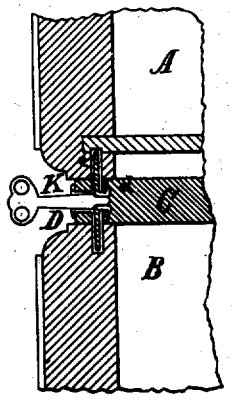

Figure 1 is a front view of a portion of a cabinet of drawers, having a part broken out to show the lock. Fig. 2 is a vertical section in line *x x* of Fig. 1.

A and B represent two drawers of a cabinet, and C is the cross-bar between them. D is the lock, which consists of a plate, *d*, having a flat bolt, *e*, pivoted to it at the middle, the pivot consisting of a round hole punched in the plate *d* and a smaller square hole punched in the bolt *e*. The burrs of this hole, being turned over the edge of the round hole, form the pivot on which the bolt turns. A square-pointed key, K, is used for turning the bolt, which, being turned up in the position seen in the drawing, locks both drawers at the same time, a slot being cut in the lower edge of the upper-drawer front, and a slot also being cut in the upper edge of the lower-drawer front, to receive the bolt. A lug, *d'*, on the plate *d* allows the bolt to make only a quarter-turn in either locking or unlocking.

The lock is set in a slot cut near the edge and in the central part of the cross-bar C, and is secured in place by two nails or screws, *c c*.

Having described my invention, I claim—

The combination, with drawers A B and bar C, of the double turn-bolt *e* at the bar, whereby both drawers may be locked or unlocked with one motion of a single key, substantially as specified.

RUEL W. WHITNEY.

Witnesses:
OSCAR HANSEN,
E. D. CHAPMAN.